United States Patent [19]

Smith

[11] Patent Number: 5,105,379
[45] Date of Patent: Apr. 14, 1992

[54] INCREMENTING SUBTRACTIVE CIRCUITS

[75] Inventor: Stewart G. Smith, Valbonne, France

[73] Assignee: VLSI Technology, Inc., San Jose, Calif.

[21] Appl. No.: 505,283

[22] Filed: Apr. 5, 1990

[51] Int. Cl.⁵ .................................................. G06F 7/50
[52] U.S. Cl. ........................................ 364/785; 364/770
[58] Field of Search .................................. 364/785, 770

[56] References Cited

U.S. PATENT DOCUMENTS

| 3,816,734 | 6/1974 | Brendzel | 364/785 |
| 3,941,990 | 3/1976 | Rabasse | 364/785 |
| 4,218,751 | 8/1980 | McManigal | 364/785 |

OTHER PUBLICATIONS

Smith & Denyer, *Serial Data Computation*, Kluwer Academic Press, 1988, pp. 59–65.
Halijak, "Binary Subtraction by Double Complemented Addition", *Comput. & Elect. Engng.*, vol. 4, Pergamon Press, 1977, Printed in Great Britain, pp. 251–254.
"A Bit-Level Pipelined Implementation of a C-CMOS Multiplier-Accumulator Using a New Pipelined Full-Adder Cell Design", Mar., 1989.

*Primary Examiner*—David H. Malzahn
*Attorney, Agent, or Firm*—Bowles Horton

[57] ABSTRACT

An incrementing subtractive circuit for use in digital signal processing is constituted by a full adder having data inputs of which at least one is inverted, a sum output, and a carry output which is coupled by way of a half adder circuit to a one bit upshifter at the carry input of the full adder. The one bit upshifter is controlled by a least significant bit control signal. The half adder includes a carry recirculation loop adapted to add a logical unity in response to the least significant bit control signal. The arrangement has the effect of adding integer two to the carry value of the full adder and achieves the additional incrementing necessary for the performance of incrementing subtraction or negating addition.

11 Claims, 2 Drawing Sheets

INCREMENTING SUBTRACTIVE CIRCUITS

FIELD OF THE INVENTION

The present invention relates generally to digital signal processing and more particularly to incrementing subtractive circuits which are primarily intended for use in high performance integer arithmetic logic circuits such as those incorporated in digital signal processors, particularly as implemented in very large scale integrated circuits though the invention in its broadest aspects is not limited for use in such a context.

BACKGROUND TO THE INVENTION

For reasons which are well established in the practice of digital signal processing, it is usually desirable to perform arithmetic computations on numbers which are represented in 2's complement form. In such a form positive numbers are represented by a sign bit (0) and bits representing the magnitude of the number whereas a negative number has a sign bit of unity (1) and bits representing the 2's complement of the magnitude. As is well known, the 2's complement form of a number is formed by taking the 1's complement of the number, by changing each zero to a 1 and vice versa, and adding unity at the least significant bit position. The 2's complement system is very convenient for the representation of negative numbers because the operation of subtraction may be performed implicitly by the actual performance of addition.

In networks composed of 2's complement integer arithmetic operators which share a common data transmission format, there is often a requirement to maximise the use of available numerical resources. Additive operators can cause a single bit word growth, which must counteracted by single bit arithmetic downshifting if overflow is to be avoided. Arithmetic downshifting introduces an error which can be minimised and made zero-mean by the operation of 'rounding'. Rounding is essentially the action of adding one bit (i.e. incrementing) at the significance of the discarded bit before that bit is discarded. While this is trivial to achieve in the case of an adder, with no penalty in relation to the area occupied by the circuits or time delay, it is more difficult to achieve in relation to a subtracter.

As is well known, subtraction of a number may be performed by 1's complementing the number, adding the number and then adding an incrementing bit at the least significant bit position. This requires only one carry propagation but its achievement requires the operation of incrementing. In a serial data system, the corresponding bits of two numbers which are to be added (or subtracted) are fed synchronously to an adder (or subtracter), normally starting with the least significant bit, and the incrementing is performed in response to a LSB control signal.

The present invention however concerns incrementing subtraction. Whereas simple subtraction may be represented as the formation of the quantity (A−B), incrementing subtraction may be represented as the formation of the quantity (A−B+1) or the quantity −(A+B). The former requires an incrementing operation additional to that required for two's complementing (−B). The latter (usually termed 'negating addition') also requires an additional incrementing operation. There is therefore the considerable problem of how to provide an incrementing subtractive circuit, e.g. an incrementing subtracter or negating adder, which requires a incrementing operation additional to that necessary for simple subtraction. The difficulty arises from the existence of, apparently, only one opportunity, namely the time of the least significant bit, for incrementing.

SUMMARY OF THE INVENTION

It is therefore one object of the invention to provide an incrementing subtractive circuit.

In a preferred form of the invention a half-adder is included in a carry path from the carry output to the carry input of an implicit subtracter, the half adder having a recirculating carry path into which an incrementing bit is injected under least-significant bit control. As will further explained hereinafter, the effect is to add integer two, by incrementing before the upshift operation performed by the main adder, to the carry value of the main adder.

Further objects and advantages of the invention will apparent from the description which follows by way of illustration and not limitation.

DETAILED DESCRIPTION OF PREFERRED EMBODIMENTS

In order to explain the operation and significance of the preferred embodiments of the invention, reference will first be made to FIGS. 1 and 2.

Figure 1:
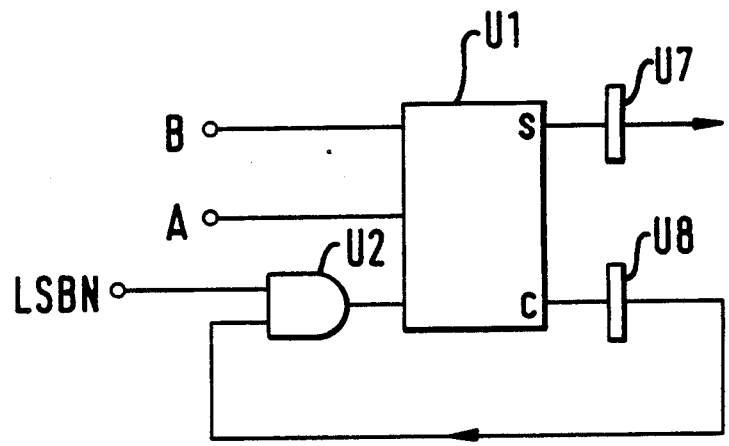
FIG. 1 illustrates a bit-serial adder by way of explanation.

FIG. 1 illustrates a serial adder arranged to receive at successive clock times the corresponding bits of two digital signals at inputs A, B respectively. The adder comprises a full adder U1 having a sum output S, a carry output C and a carry input to which is connected an AND gate U2 which receives a least-significant bit control signal, which is active-low, and the recirculated carry signal. The sum and carry outputs of the adder are latched, in this embodiment by means of clocked D-flipflops U7 and U8 respectively. For simplicity the clock inputs are omitted.

A bit serial adder assimilates two equally weighted input signals and produces their sum as an output. For each bit the sum function is not closed because the output may take the numerical value outside the binary set of values associated with its input. This requires the provision of a second output, the carry, which has to have twice the (binary) weight of the sum signal.

In a bit-parallel adding, the carry is doubled in weight by connection to the spatially successive full adder. In bit-serial operation, the doubling of the weight is achieved by coupling the carry signal to the temporally successive adder, i.e. by recirculation of the carry signal by way of a clocked delay.

The function of the AND-gate U2 is to insert a zero in the carry loop at LSB time, clearing the loop. The LSBN signal is active-low. In fact this gate U2 acts as a one bit upshifter (or 2 times multiply). The upshifting has the effect of removing the most significant bit of a carry word, replacing it with logical zero. The operation has a functional latency of −1 bit, which cancels the actual delay of the latch U8 in the carry path, thereby maintaining signal consistency. For a further explanation of the operation and significance of upshifting, reference may be made to Smith and Denyer, 'Serial Data Computation', Kluwer Academic Press, 1988, pages 59 to 67.

Figure 2:
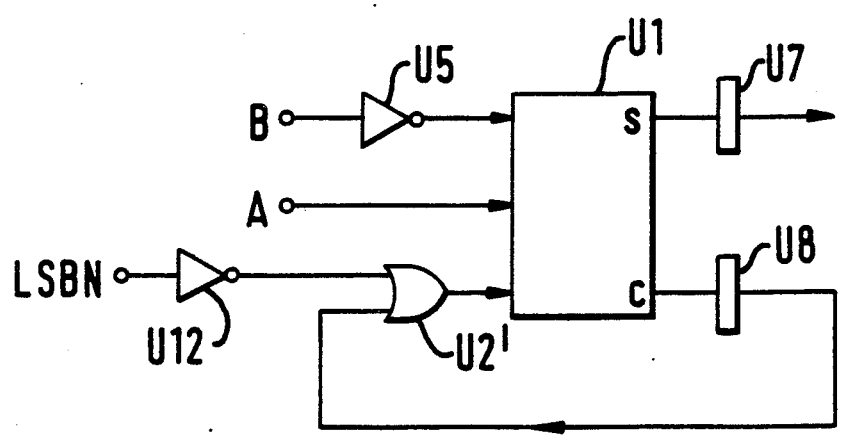
FIG. 2 illustrates by way of explanation an implicit subtracter comprising a modification to the adder of FIG. 1.

From the adder circuit shown in FIG. 1 one may construct a simple subtracter by including the inverter U5, inverting the control signal (LSBN) by means of, for example, an inverter U12, and changing the AND-gate U2 to an OR-gate U2', as shown in FIG. 2. The inverter U5 will effect a 1's complement of the input B whereas the inversion of the control signal and the change of the AND-gate U2 to an OR-gate effectively insert a logical '1' instead of '0' at the time of the least significant bit so as to provide the incrementing bit necessary for the correct 2's complementing of the input B. This is possible because the upshifting is effectively a multiply by two operation; this provides a bottom zero which can be incremented by unity without the propagation of a carry bit.

However, such an incrementing operation can be performed only once and the same prescription cannot be used for an incrementing subtracter.

The present invention solves the problem by the addition of, effectively, integer two to the recirculated, upshifted carry signal. This addition may he achieved by an incrementation before the upshift operation.

To derive one embodiment of the invention, instead of converting the adder shown in FIG. 1 to a simple subtracter, the AND-gate U2 is retained because no increment will be performed in the main adder. In order to provide the incrementation of the carry before the upshifting, the implicit subtracter is modified by the inclusion in the carry path of a half adder constituted by an exclusive OR-gate U6 and an AND-gate U3, providing a sum output and a carry output respectively. The half adder receives its own carry signal and the carry signal from the main adder and an incrementing bit is injected into the carry path of the half adder under LSB control.

In particular, the inputs to the half adder are the recirculated carry from the latch U8 and the recirculated carry from the half adder. The carry output from the gate U3 is applied to one input of an OR gate U4 which is latched by means of a clocked D-type flip-flop U9. The other input of the OR-gate U4 is an active-high LSB control signal, obtained by way of an inverter U10 from the active-low LSB control signal.

In this circuit, the incrementing bit at LSB-time is derived from the inverted LSB control signal using the OR-gate U4. The difference in operation from that of the subtracter is that the incrementing bit is inserted before the latch U9. Thus the extra circuitry effectively adds integer two to the carry value.

Although this circuit introduces an extra gate delay (the exclusive-OR gate U6) in the carry path, there is minimal increase in delay through the subtracter, as measured between a data or control input and the data output. Whereas the carry path is local, in general data and control inputs originate more remotely and, owing to propagation delays, can be expected to arrive later than the carry signal. Because the logic evaluation of the extra exclusive-OR gate proceeds concurrently with the propagation of remotely generated data and control signals, its effect on overall delay is minimal.

Moreover, in most realisations one of the three inputs to a full adder 'sees' a shorter path to the outputs than do the other inputs. That one input is usually the carry-input and so even if the XOR gate U6 is in the critical path (as regards full-adder inputs) there is more slack time available while the A and B inputs are being evaluated.

Figure 3:
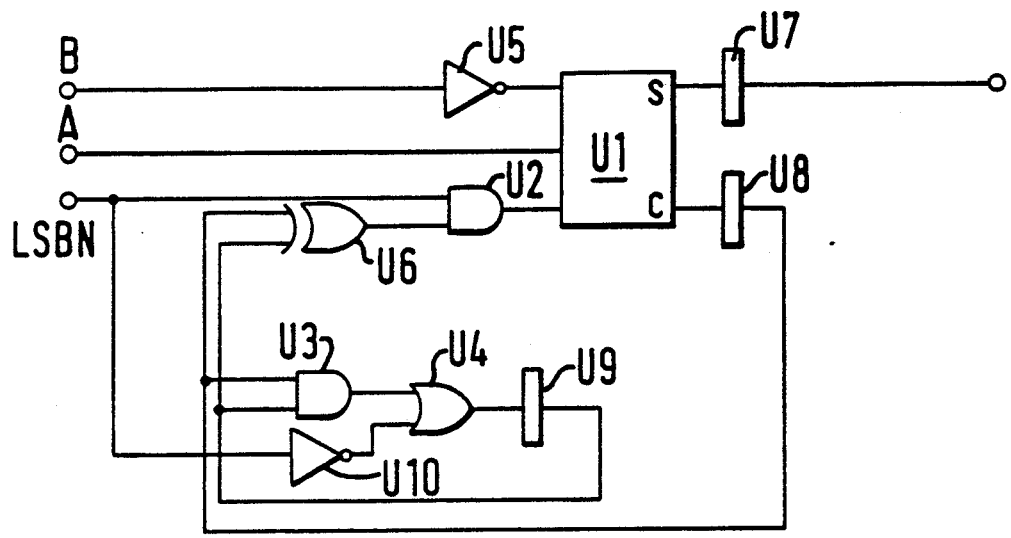
FIG. 3 illustrates one embodiment of an incrementing subtracter, developed from the subtracter of FIG. 2.
Figure 4:
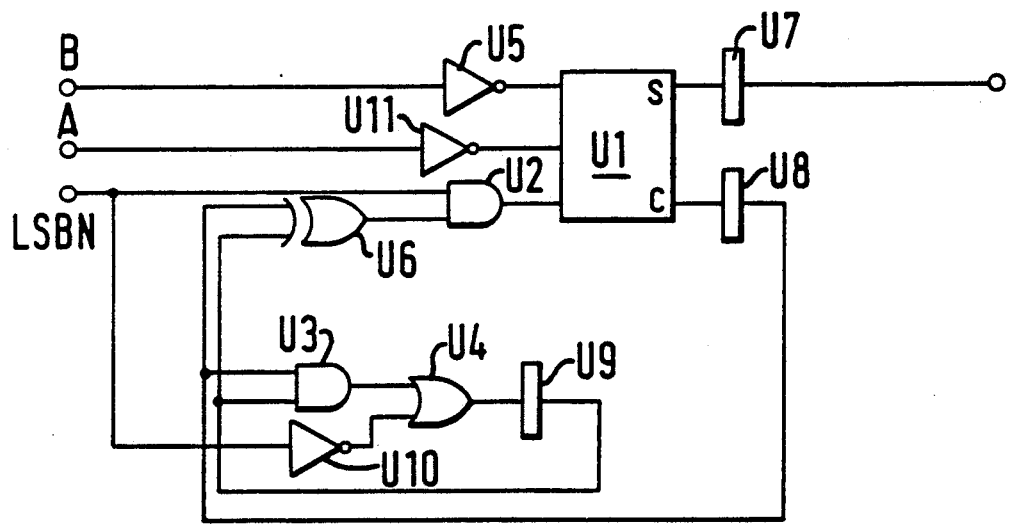
FIG. 4 illustrates a negating adder according to the invention.

The embodiment shown in FIG. 4 operates in a manner similar to that shown in FIG. 3. However it includes an inverter U11 for the A input of the adder, which now is configured to compute, bit-serially, the negated sum −(A+B). The incrementing bit is inserted in the same way as described in relation to FIG. 3.

A negated sum can be computed using known circuits which perform two distinct carry-propagate delays, viz. adding and then negating. The present invention enables the computation of a negated sum with effectively only one carry-propagate delay. This is particulary important in high-performance digital signal processing wherein it is important to maximise the usage of the available hardware and achieve reduction in delay.

Those skilled in the art will understand that various changes and modifications may h=made without departing from the spirit and scope of the invention as set forth in the claims that follow.

I claim:

1. An incrementing subtractive circuit for two input bit serial signals each having a least significant bit and corresponding more significant bits, comprising:
   a full adder having first and second data inputs, a carry input, a sum output and a carry output;
   means including a clocked delay and an upshifter for recirculating a carry value of the adder from said carry output to the carry input;
   means for negating at least one data input of the full adder;
   means for providing a control signal at a time of said least significant bits; and
   logic means included in said means for recirculating and interposed between the said clocked delay and the upshifter and responsive to said control signal to augment the carry value of the adder by integer two.

2. An incrementing subtractive circuit as set forth in claim 1 wherein said logic means comprises:
   a half adder coupled to provide a sum output to said upshifter and having a recirculating carry path for a carry output; and
   means for injecting an incrementing bit into said carry path.

3. An incrementing subtractive circuit as set forth in claim 2 wherein the recirculating carry path comprises a latch and the means for injecting comprises gate means before said latch.

4. An incrementing subtractive circuit as set forth in claim 3 wherein said gate means for injecting the incrementing bit comprises an OR gate having inputs for receiving the carry output of the half adder and said control signal.

5. An incrementing subtractive circuit as set forth in claim 3 wherein said latch comprises a D-type flip-flop.

6. An incrementing subtractive circuit as set forth in claim 3 wherein said upshifter comprises an AND-gate means.

7. An incrementing subtractive circuit as set forth in claim 2 and comprising means for negating both data inputs for said full adder.

8. An incrementing subtractive circuit for two input bit serial signals each having a least significant bit and corresponding more significant bits, comprising:
   a full adder having first and second data inputs, a carry input, a sum output and a carry output;
   an upshifter coupled to said carry input;
   means coupled to said carry output for recirculating by way of a bit delay a carry signal of the full adder;
   means for negating at least one data input of the full adder;
   a half adder coupled to provide a sum output to said upshifter, said half adder including a carry recirculation path and being coupled to receive both said carry signal from said means for recirculating and a signal from said carry recirculation path; and
   means for inserting an incrementing signal into the said carry recirculation path of said half adder.

9. An incrementing subtractive circuit as set forth in claim 8 wherein said means for recirculating and said carry recirculation path each include a respective latch and said means for inserting comprises OR-function means responsive to a carry signal of the half adder and a control signal contemporaneous with the least significant bits of the serial signals.

10. An incrementing subtractive circuit as set forth in claim 9 wherein said half adder comprises an exclusive-OR gate for providing the sum output of the half adder and an AND gate for providing the carry signal of the half adder.

11. An incrementing subtractive circuit for two input bit serial signals each having a least significant bit and corresponding more significant bits, comprising:
   a full adder having firs and second data inputs, a carry input, a sum output and a carry output;
   a carry recirculation loop extending from said carry output, including a clocked delay and a means for coupling a carry signal from said carry output to said carry input at times other than times of the least significant bits;
   means for providing a control signal at times of said least significant bits; and
   means coupled to said loop and responsive to said control signal and said carry signal for providing an incrementing signal having double a binary weight of the integer sum of the control signal and the carry signal for augmenting the value of the carry signal by a value of integer two.

* * * * *